July 27, 1965  E. C. BRUNDER  3,196,806
DRIVE MECHANISMS
Filed July 18, 1963  3 Sheets-Sheet 1
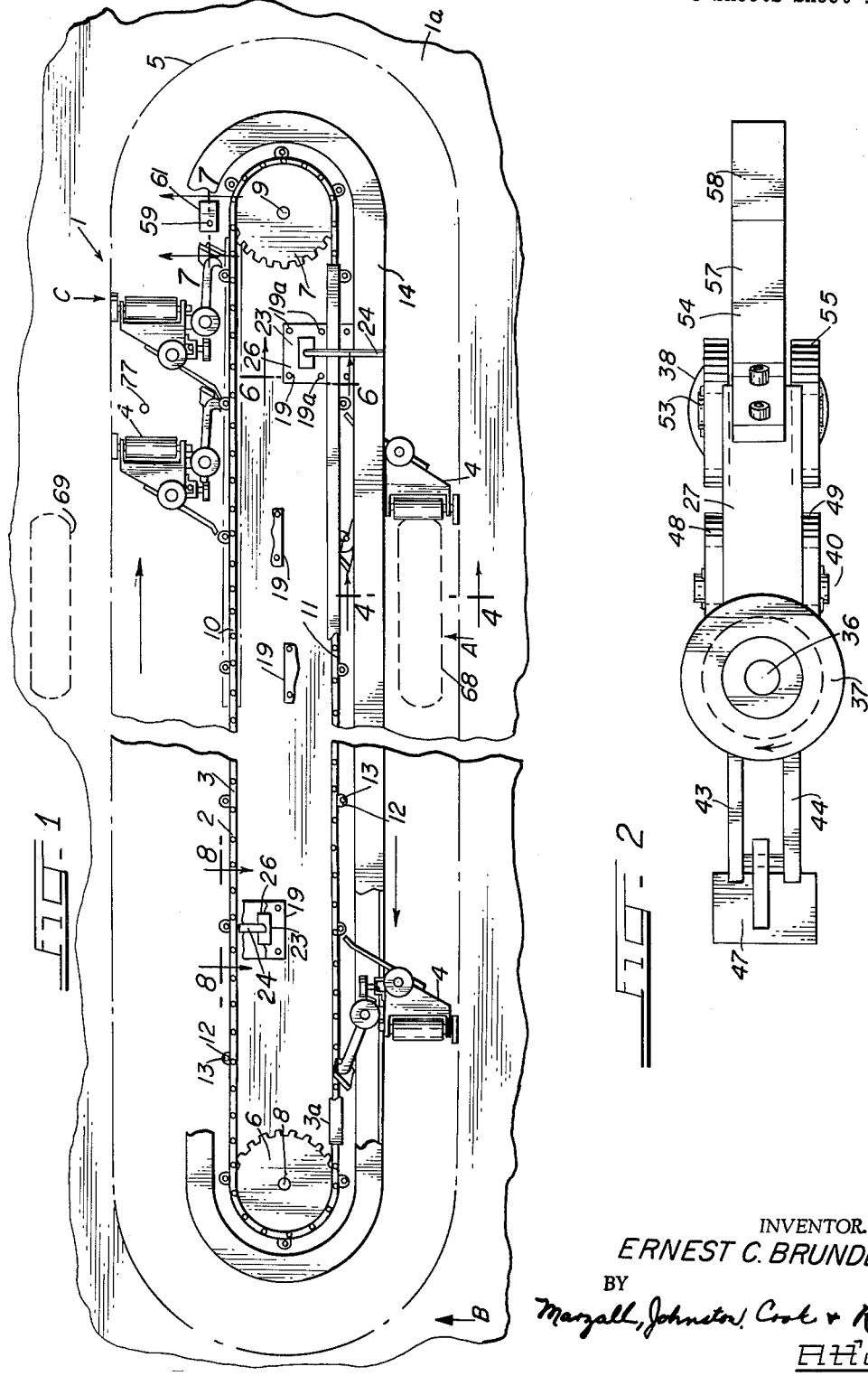
INVENTOR.
ERNEST C. BRUNDER
BY
Marzall, Johnston, Cook & Root
ATTYS.

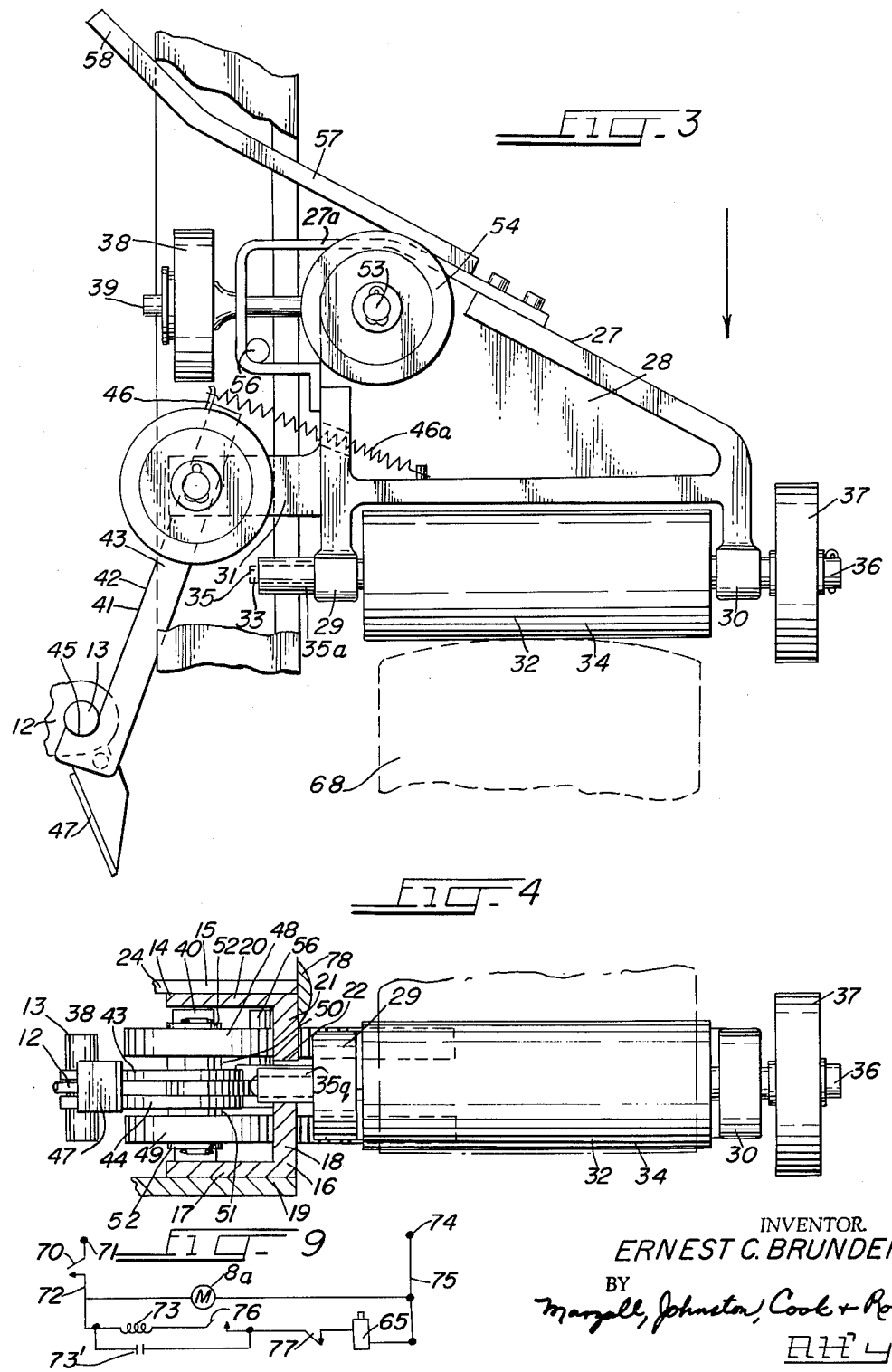

July 27, 1965  E. C. BRUNDER  3,196,806
DRIVE MECHANISMS
Filed July 18, 1963 3 Sheets-Sheet 3
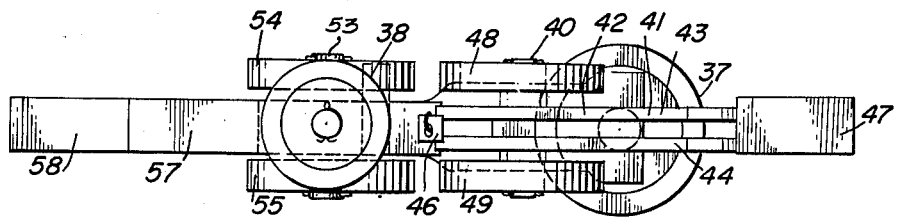
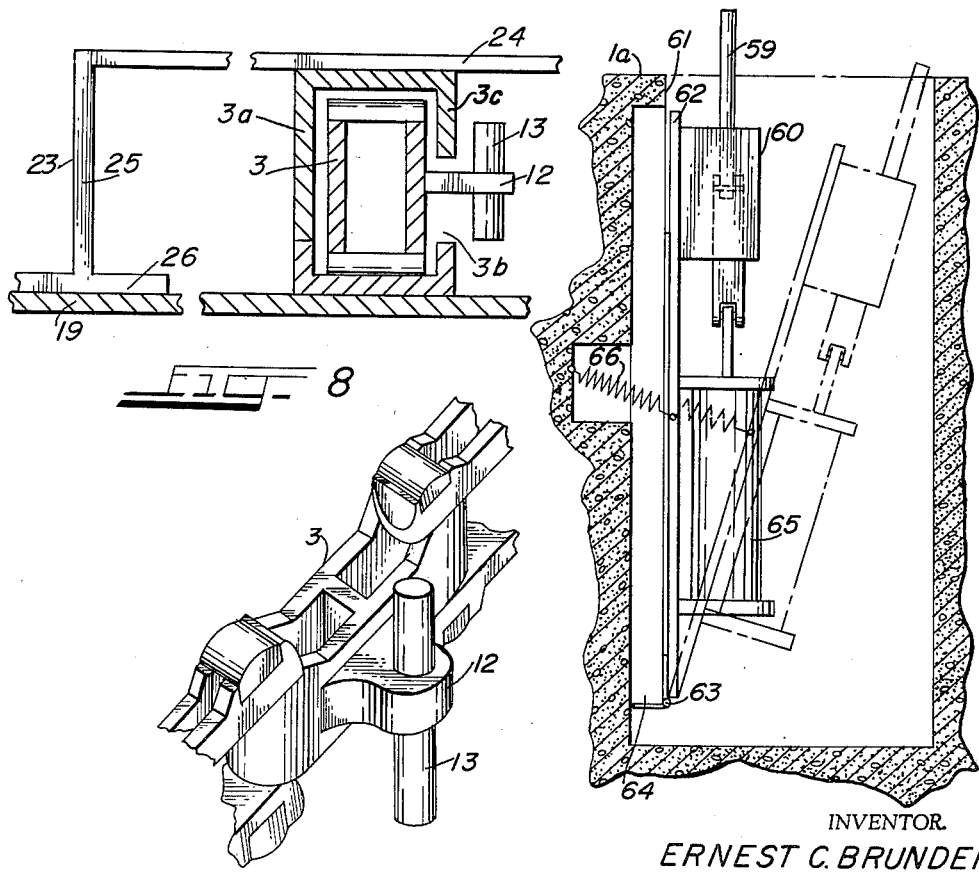
INVENTOR.
ERNEST C. BRUNDER 3,196,806
DRIVE MECHANISMS
Ernest C. Brunder, 411 Pine Manor Drive, Wilmette, Ill.
Filed July 18, 1963, Ser. No. 295,916
15 Claims. (Cl. 104—172)

This invention relates to drive mechanisms and, more particularly, to drive mechanisms which are particularly well adapted for moving vehicles, such as automobiles and the like, along predetermined paths of movement, such as through washing units and the like.

A primary object of the present invention is to afford a novel drive mechanism.

Drive mechanisms for moving vehicles through a predetermined path of movement, such as, for example, through washing units and the like, have been heretofore known in the art. However, such drive mechanisms as have been heretofore known in the art have commonly had several inherent disadvantages, such as, for example, requiring that pull chains, and the like, be manually connected and disconnected from the vehicle to be moved at the start and completion, respectively, of the movement thereof; not being adapted for use with automatic, or remote controlled wash units; being complicated or difficult to use; being large and cumbersome in size; or being inefficient or impractical in use, and the like. It is an important object of the present invention to overcome such disadvantages.

Another object of the present invention is to afford a novel drive mechanism for moving vehicles, and the like, wherein the parts thereof are constituted and arranged in a novel and expeditious manner.

Another object is to afford a novel drive mechanism, which is operable to move a vehicle, and the like, by pushing the same in a novel and expeditious manner.

Yet another object is to afford a novel drive mechanism of the aforementioned type wherein the parts thereof are readily accessible, and which may be readily serviced and maintained.

A further object of the present invention is to afford a novel drive mechanism of the aforementioned type which embodies a novel pusher unit for operatively engaging such a vehicle to be moved.

Another object is to afford a novel drive mechanism of the aforementioned type wherein novel pusher units may be connected to and released from drive units therefor in a novel and expeditious manner.

Another object is to afford a novel driving unit for such pusher units.

A further object is to afford a novel driving mechanism embodying novel pusher units which may be automatically connected to and disconnected from such driver units in a novel and expeditious manner.

Another object of the present invention is to afford a novel driving mechanism of the aforementioned type wherein the parts thereof are so constituted and arranged that the entire operation thereof may be controlled by remote control, such as, for example, from a remotely disposed coin-operated control mechanism.

Another object is to afford a novel drive mechanism of the aforementioned type which is practical and efficient in operation, and which may be readily and economically produced commercially.

Other and further objects of the present invention will be apparent from the following description and claims and are illustrated in the accompanying drawings, which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a somewhat diagrammatic, top plan view of a drive mechanism embodying the principles of the present invention;

FIG. 2 is a side elevational view of a pusher unit embodied in the drive mechanism shown in FIG. 1;

FIG. 3 is a fragmentary top plan view of a portion of the drive mechanism shown in FIG. 1;

FIG. 4 is an enlarged, fragmentary detail sectional view taken substantially along the line 4—4 in FIG. 1;

FIG. 5 is a side elevational view of the pusher unit shown in FIG. 2, looking at the opposite side thereof;

FIG. 6 is a fragmentary, detail sectional view taken substantially along the line 6—6 in FIG. 1;

FIG. 7 is a fragmentary, enlarged, detail sectional view taken substantially along the line 7—7 in FIG. 1;

FIG. 8 is an enlarged fragmentary perspective view taken substantially along the line 8—8 in FIG. 1; and FIG. 9 is a diagrammatic illustration of a portion of the electrical system of the drive mechanism shown in FIG. 1.

A drive mechanism 1, embodying the principles of the present invention, is shown in the drawings to illustrate the preferred embodiment of the present invention.

The drive mechanism 1 is particularly well adapted for moving an automobile, or the like, along a predetermined path of travel such as, for example, from station A to station B, as shown in FIG. 1. It embodies, in general, a drive unit 2, including a drive chain 3 for moving pusher units 4 out of a storage station C, around an orbital path 5, and back to the storage station C, FIG. 1, the pusher units 4 moving around the orbital path 5 in a clockwise direction, as viewed in FIG. 1.

The drive unit 2 includes a drive sprocket wheel 6 and an idler sprocket wheel 7 disposed in substantially horizontal, uniplanar relation to each other, the sprocket wheels 6 and 7 being mounted on the shafts 8 and 9, respectively, which are journaled in a suitable support therefor, such as, for example, a concrete floor 1a, FIGS. 1 and 7, over which vehicles are moved by the drive mechanism 1. The drive shaft 8 may be connected to any suitable power unit for rotating the same, such as, for example, a suitable electric motor 8a, FIG. 9, which may be mounted in any suitable location, such as, for example, in the aforementioned floor 1a. The drive shafts 8 and 9 preferably project substantially vertically upwardly from the floor 1a, and the sprocket wheels 6 and 7 are preferably disposed thereon in upwardly spaced, closely adjacent relation to the floor 1a.

The drive chain 3 is trained over the sprocket wheels 6 and 7 for rotation therearound upon driving rotation of the drive sprocket 6. The sprocket chain 3 is disposed in such position on the sprocket wheels 6 and 7 as to afford two substantially parallel, horizontally spaced passes 10 and 11, and the rotation of the drive sprocket wheel 6 during operation of the drive mechanism 1 is such as to cause the pass 10 to move from left to right, and the pass 11 to move right to left, as viewed in FIG. 1.

A plurality of lugs 12 are mounted on and carried by the chain 3, and project horizontally outwardly therefrom. The lugs 12 are spaced from each other along the chain 3, and each has a respective, substantially vertically extending pin 13 mounted therein and carried thereby, FIGS. 1 and 8, for a purpose which will be discussed in greater detail presently.

A guide rail 14, which includes a top rail 15 and a bottom rail 16 disposed in vertically spaced, substantially parallel relation to each other, FIGS. 1 and 4, is disposed around the drive chain 3 in substantially parallel, horizontally outwardly spaced relation thereto. The rails 15 and 16 may be made of any suitable material, such as, for example, angle iron. The rail 16 includes a bottom flange 17 and a side flange 18 disposed in substantially perpendicular relation to each other. The bottom rail 16 is mounted on and attached to a plurality of spaced, substantially flat plates 19, which rest on the floor 1a and are secured thereto by suitable means such as bolts 19a, FIG. 1. The flange 17 rests on the plate 19, with the side flange 18 projecting upwardly from the bottom flange 17 on the side thereof remote from the chain 3.

The top rail 15 of the guide rail 14 includes a top flange 20 and a side flange 21 disposed in substantially perpendicular relation to each other, and is disposed above the bottom rail 16 with the top flange 20 disposed in substantially parallel, upwardly spaced relation to the bottom flange 17, and with the side flange 21 projecting downwardly from the top flange 20 in substantially uniplanar relation to the side flange 18. The side flange 21 terminates at its lower edge in upwardly spaced relation to the upper edge of the side flange 18, to thereby afford a slot 22 therebetween.

The top rail 15 is supported in the aforementioned upwardly spaced relation to the bottom rail 16 by a plurality of supporting brackets 23. Each of the supporting brackets 23 includes a horizontally extending, elongated leg 24 having one end portion secured to the upper face of the upper flange 20 of the top rail 15, and another leg 25 extending downwardly from the other end of the leg 24 and secured at its lower end to a supporting base 26 secured to the upper face of a respective one of the plates 19 between the passes 10 and 11 of the chain 3, FIGS. 1 and 6, the leg 24 extending across a respective pass 10 or 11 of the chain 3 in upwardly spaced relation thereto.

A guide rail 3a, FIGS. 1 and 6, is disposed in position to extend along the major portion of the pass 11 in surrounding relation thereto. The guide rail 3a is substantially square in transverse cross-section, and has an elongated slot 3b formed in the outer side wall 3c of the rail 3a. The slot 3b extends the length of the side wall 3c, and the lugs 12 on the chain 3 extend outwardly therethrough during passage of the lugs 12 along the pass 11. The pins 13 in the lugs 12 are disposed outwardly of the guide rail 3a, inwardly of the adjacent portion of the guide rail 14 during movement along the pass 11.

All of the pusher units 4 are identical in construction. Each includes a supporting frame 27 having a substantially triangular-shaped main body portion 28, two forwardly projecting ears 29 and 30 and a laterally projecting ear 31, FIG. 3. The ears 29 and 30 project forwardly from the front edge portion of the main body portion 28 in horizontally spaced parallel relation to each other, and the ear 31 projects from the front edge portion of the main body portion 28 rearwardly of the ears 29 and 30, and in substantially perpendicular relation to the latter. A pusher bar 32, including a substantially straight, elongated shaft 33 on which a roller 34 is mounted, is connected to the frame 27 by the ears 29 and 30, the roller 34 being disposed between the ears 29 and 30, and the shaft 33 being mounted in and extending through the ears 29 and 30. One end 35 of the shaft 33 extends outwardly from the ear 29 in forwardly spaced, substantially parallel relation to the ear 31, and the other end 36 of the shaft 33 projects outwardly from the other ear 30. A wheel 37 is rotatably mounted on the end portion 36 of the shaft 33, and another wheel 38 is rotatably mounted on another shaft 39 which projects outwardly from the rear portion of the frame 27 on the other side of the latter remote from the wheel 37. A roller 35a is rotatably mounted on the end portion 35 of the shaft 33.

The shaft 33 and the wheel 37 on each of the pusher units 4 are so disposed on the frame 27 thereof, that when the pusher unit 4 is disposed in operative position in the drive mechanism 1, the end portion 35 of the shaft 33 extends into the slot 22 of the guide rail 4, with the roller 35a resting on the upper edge portion of the side rail 18 thereof in rolling engagement therewith, and the wheel 37 rests on the supporting floor 1a on which the guide rail 14 is mounted, to thereby support the front end portion of the pusher unit 4. The shaft 39 and the wheel 38 on each of the pusher units 4 are so disposed on the frame 27 thereof, that when the pusher unit 4 is disposed in the aforementioned operative position in the drive mechanism 1, the shaft 39 is disposed in the slot 22 of the guide rail 14 and extends horizontally through the guide rail 14 into position wherein the wheel 38 is disposed between the flanges 17 and 20 of the guide rail 14 to thereby support the rear end of the pusher unit 4 from the flange 17.

A vertically extending shaft 40 is mounted in and carried by the free end portion of the laterally extending ear 31, and projects both upwardly and downwardly therefrom. A coupling member 41, including an elongated, substantially straight arm 42 is rotatably mounted on the central longitudinal portion of the shaft 40. The arm 42 includes two substantially parallel spaced plates 43 and 44 disposed above and below the free end portion of the lateral ear 31, in juxtaposition to the upper and lower faces thereof, respectively. The pin 40 extends through the plates 43 and 44, and the arm 42 projects forwardly therefrom and terminates at its front end in a rearwardly opening hook 45. A plate 46 is secured to the rear end portions of the plates 43 and 44, and a tension coil spring 46a has one end connected to the plate 46 and the other end connected to the frame 27 in position to urge the coupling member 41 in a clockwise direction around the shaft 40, as viewed in FIG. 3. A cam plate 47 is mounted between and secured to the front end portions of the plates 43 and 44 in stationary relation thereto. The hook 45 is so disposed on the arm 42 that it opens toward the chain 3, and the coupling members 41 are so disposed on the pusher units 4 that when the pusher units 4 are disposed in operative position in the drive mechanism 1 and free to rotate on the shafts 40, the springs 46a are effective to rotate the coupling members 41 into position wherein the hooks are disposed in position to operatively engage any one of the pins 13 moving therepast to thereby operatively couple the pusher units 4 to the chain 3 for movement thereby. The cam plate 47 on each of the pusher units 4 is so disposed on the arm 42 that it projects forwardly therefrom away from the chain 3, for controlling the connecting of the pusher unit 4 to the chain 3, as will be discussed in greater detail presently.

Two wheels 48 and 49 are also rotatably mounted on the shaft 40. The wheel 48 is disposed above the coupling member 41 and is spaced therefrom by a suitable spacing member 50. The wheel 49 is disposed below the coupling member 41 and is spaced therefrom by a suitable spacing member 51. The wheels 48 and 49 are retained in position on the shaft 40 by suitable retaining means such as, for example, snap rings 52. The shaft 40 and the wheels 48 and 49 are so constituted and arranged, that when the pusher unit 4 in which they are mounted is disposed in operative position in the drive mechanism 1, the outer peripheries of the wheels 48 and 49 are engaged with the inner faces of the side flanges 21 and 18, respectively, of the guide rail 14, to thereby prevent movement of the front portion of the pusher unit 4 outwardly away from the guide rail 14.

Another vertically extending shaft 53 is mounted in the rear end portion of the frame 27, and projects both upwardly and downwardly therefrom, FIGS. 2 and 3. Two other wheels 54 and 55 are mounted on the upper and lower end portions of the shaft 53, above and below the frame 27, respectively. The shaft 53 and the wheels 54 and 55 are so constituted and arranged that when the pusher unit 4 on which they are mounted is disposed in operative position in the drive mechanism 1, the outer peripheries of the wheels 54 and 55 are disposed in engagement with the outer faces of the guide flanges 21 and 18, respectively, of the guide rail 14, to thereby prevent inward movement of the rear portion of the pusher unit 4 relative to the guide rail 14.

A substantially U-shaped bracket 27a is mounted on the rear portion of the frame 27 of each of the pusher units 4 in such position that, when the pusher units 4 are disposed in operative position in the drive mechanism 1, the brackets 27a extend through the slots 22 into the guide rail 14. A pin 56 is secured to and carried by the bracket 27a, and is disposed in such position thereon, that when the bracket 27a is disposed in the aforementioned operative position in the guide rail 14, the pin 56 is disposed in closely underlying relation to the lower face of the top flange 15 of the guide rail 14 to thereby prevent upward movement of the rear portion of the pusher unit 4. When disposed in the aforementioned operative position, the pin 56 is also disposed in closely adjacent relation to the inner face of the side flange 21 of the guide rail 14 to thereby prevent outward movement of the rear portion of the pusher unit 4 relative to the guide rail 14.

Each of the pusher units 4 also includes an elongated bumper member 57 projecting rearwardly from the rear portion of the frame 27 thereof. The bumper member 57 on each of the pusher units 4 is so disposed thereon that when the pusher units 4 are disposed in operative position in the drive mechanism 1, the bumper member 57 thereon projects inwardly toward the drive chain 3, terminating at its rear end in relatively closely adjacent outwardly spaced relation thereto, FIG. 1. The rear end portions 58 of the bumper members 57 hook rearwardly from the remainder thereof for a purpose which will be discussed in greater detail presently.

The drive mechanism 1 also includes a plunger 59 reciprocably mounted in a mounting bracket 60 in an opening 61 in the supporting floor 1a at the storage station C, FIGS. 1 and 7. The bracket 60 is secured to the upper end portion of a plate 62 which is pivotally mounted at its lower end by suitable means such as a hinge 63 to a supporting base 64 mounted in the opening 61. A solenoid 65 is secured to the lower end portion of the plunger 59 and is spring urged upwardly so that it is effective, when deenergized, to hold the plunger 59 in upwardly projecting relation to the floor 1a. When the solenoid 65 is energized, it is effective to draw the plunger 59 vertically downwardly into the opening 61.

A tension coil spring 66 is secured at one end to the plate 62, and at the other end to the floor, and is effective to normally yieldingly hold the plate 62 in the vertically upstanding position shown in solid lines in FIG. 7. When sufficient force is applied to the plunger 59 in a left to right direction, as viewed in FIG. 7, the plate 62, and, therefore, the plunger 59, the bracket 60, and the solenoid 65 are movable around the hinge 63 against the urging of the spring 66 into the position shown in broken lines in FIG. 7, to thereby dispose the upper end of the plunger 59 below the floor 1a, for a purpose which will be discussed in greater detail presently.

The plunger 59 is disposed at the storage station C, FIG. 1, in such position that when the plunger 59 is disposed in fully raised position, as shown in FIG. 6, it is disposed in position to operatively engage the cam plate 47 of the front pusher unit 4 at the storage station C to thereby hold the hook 45 of the coupling member 41 thereof outwardly away from the drive chain 3 a sufficient distance to prevent the hook 45 from engaging the pins 13. If it is desired to cause the front pusher unit 4 at the storage station C to move around the orbital path 5, the solenoid 65 may be energized, while the chain 3 is moving, to thereby retract the plunger 59 and permit the coupling member 41 to operatively hook onto the next rod 13 moving therepast, as illustrated by the two lowermost pusher units 4 shown in FIG. 1. This engagement of the coupling member 41 with the drive chain 3 pulls the pusher unit 4 from the storage station C, through the orbital path 5, and back to the storage station C. During the movement of the pusher unit 4 around the orbital path 5, the solenoid 65 may again be deenergized to thereby permit the plunger 59 to move upwardly into the fully extended position shown in solid lines in FIG. 6. In such position, the plunger is effective to engage the cam plate 47 of the pusher unit 4 as it again moves into the storage station C to thereby cam the hook 45 on the coupling member 41 outwardly away from the chain 3 and disengages the pusher unit 4 from the chain 3.

As a practical matter, it is preferred to have a plurality of pusher units 4 available at all times at the storage station C. When the forwardmost one of such pusher units 4 is held disengaged from the chain 3 by the plunger 59, as shown in FIG. 1, the cam member 47 on the next pusher unit 4 at the storage station C is engaged by the end portions 58 of the bumper member 57 on the first pusher unit 4, to thereby hold the coupling member 41 of the second pusher unit 4 out of operative engagement with the pins 13 on the chain 3. This is repeated throughout all of the pusher units 4 disposed at the storage station C, each pusher unit disposed behind the forwardmost pusher unit having its coupling member 41 held out of engagement by the bumper unit 57 on the pusher unit 4 disposed immediately ahead thereof.

In the operation of the drive mechanism 1, with all of the pusher units 4 disposed at the storage station C, and with the forwardmost one of the pusher units 4 held by the pin 59 in uncoupled relation to the chain 3, as shown in FIG. 1, an automobile may be driven into initial position A relative to the drive mechanism 1. In such position, the automobile straddles the drive mechanism 1 with the left front wheel disposed in the position indicated at 68 in FIG. 1, to be engaged by the pusher unit 4 as it moves with the pass 11 of the chain 3; and the right front wheel is then disposed in outwardly spaced relation to the orbital path 5 on the side of the drive mechanism 1 remote from the front wheel 68, as indicated at 69 in FIG. 1. With the automobile disposed in such position, the drive motor 8a for the drive sprocket 6 may be energized by closing a normally open switch 70, FIG. 9, to thereby operatively rotate the drive sprocket 6 and the chain 3. The switch 70 is connected at one side to one side 71 of a suitable source of electric power, and the other side of the switch 70 is connected through a conductor 72, the motor 8a, and a conductor 73 to the other side 74 of the electric power source, FIG. 9.

The solenoid 65 is connected through a relay 75, a normally open switch 76, and a spring urged, normally closed push button switch 77 to the conductors 72 and 73, in parallel to the motor 8a. The push button switch 77 is disposed at the storage station C, FIG. 1, in such position that when a pusher unit 4 moves forwardly from second position toward first position at the storage station C, the roller 34 rolls over the switch 77 to thereby momentarily open the same, for a purpose which will be discussed in greater detail presently.

After operation of the drive mechanism 1 has been initiated by closing the master control switch 70, the switch 76, which may be any suitable type of switch, such as, for example, a coin actuated switch, may be momentarily closed. The closing of the switch 76 causes the solenoid 65 to be energized, and also causes the relay 73 to be energized. The energization of the solenoid 65 retracts the plunger 59 to thereby permit the coupling member 41 on the forwardmost pusher unit 4 at the storage station C to operatively engage the next pin 13 moving therepast, and thereby couple the forwardmost pusher unit 4 to the chain 3 for movement thereby.

As the forwardmost pusher unit 4 moves in a clockwise direction around the orbital path 5 from the storage station C, it moves into engagement with the rear outer periphery of the front wheel 68 of the automobile disposed at station A. As the pusher unit 4 continues to move, it is effective to push the automobile from right to left, as viewed in FIG. 1, longitudinally of the drive mechanism 1. When the automobile is moved to station B, the wheel 68 moves to the left past the orbital path 5, to thereby move out of engagement with the pusher unit 4, and the pusher unit 4 continues on around the orbital path 5 back to the storage station C. At the storage station C the cam plate 47 on the pusher unit 4 moves into engagement with the portion 58 on the bumper member 57 on the rearwardmost pusher unit 4 at the storage station C, and is disengaged thereby from the chain 3.

The wheels 54 and 55 and the wheels 48 and 49 are so constituted and arranged on each of the pusher units 4 that when they are operatively engaged with the guide rail 14 the roller 34 on the respective unit slopes rearwardly at a relatively small acute angle, such as, for example, four degrees, to the perpendicular to the guide rail 14. The pressure thus exerted on the wheel 68 thus tends to keep the wheel 68 snugly against the guide rail 14, the wheel 68 tending to ride inwardly along the roller 34 toward the guide rail 14.

A suitable protective device such as a bumper flange 78, FIG. 4, may be mounted on the upper outer edge portion of the guide rail 14 which is adjacent to the pass 11 of the chain 3, to afford a relatively broad, rounded surface for abuttingly engaging the wheel 68 as it moves from the station A toward the station B.

The energization of the relay 73, caused by the closing of the switch 76 closes the normally open relay contacts 73' to thereby afford a holding circuit for the relay 73 so that opening of the switch 76 is ineffective to deenergize the solenoid 65. The holding circuit insures that the solenoid 65 will remain energized for a sufficient length of time that the front pusher unit 4 will move entirely past the plunger 59 before the plunger 59 again moves into raised position.

It will be remembered that in such an operation of the drive mechanism 1, the forwardmost pusher unit 4 moves away from the storage station C. This, of course, moves the bumper member 57 thereof out of engagement with the cam 47 on the coupling member 41 of the next pusher unit 4. This permits the coupling member 41 on the last-mentioned pusher unit 4 to swing inwardly toward the chain 3 into position to operatively engage the next rod 13 moving therepast, and connect the second pusher unit 4 to the chain 3 for movement thereby toward the position just vacated by the front pusher unit 4. As the second pusher unit 4 moves toward the first position, the roller 34 thereon actuates the push button switch 77 to thereby open the latter. This causes both the relay 73 and the solenoid 65 to be deenergized. The deenergization of the solenoid 65 permits the plunger 59 to again move upwardly into position to engage the cam plate 47 on the second pusher unit 4 as the latter moves into forwardmost position at the storage station C, to thereby uncouple this pusher unit from the chain 3. The deenergization of the relay 73 causes the relay contacts 73' to open to thereby open the holding circuit around the switch 76 and prevent the energization of the solenoid 65 until the switch 76 is again closed.

The aforementioned forward movement of the second pusher unit 4 into forwardmost position also frees the next pusher unit 4, so that the next pusher unit 4 is operatively connected to the chain 3 and moves forwardly into position wherein the bumper unit 57 on the second pusher unit 4 operatively engages the cam 47 on the coupling member 41 of the next pusher unit 4 to thereby again disengage that pusher unit from the chain 3. This is repeated for each of the pusher units 4, seriatim, at the storage station C.

It will be seen that with the pusher bar 32 constituted and arranged in the manner disclosed herein, the roller 34 thereof affords a practical abutment member for engaging the periphery of the wheel 68. Also, it will be seen that when the pusher unit 4 is disposed in such pushing engagement with the wheel 68, the engagement of the wheel 68 with the roller 34 urges the pusher unit 4 to rotate in a counterclockwise direction, as viewed in FIG. 1. However, the engagement of the rollers 48 and 49 with the interior of the guide rail 14, and the engagement of the rollers 54 and 55 with the outer surface of the guide rail 14, FIGS. 3 and 4, firmly hold the pusher unit 4 against such rotation, and insures that the pusher unit 4 will remain in its predetermined orbital path 5 during operation of the drive mechanism 1.

It will be remembered that the plunger 59 is mounted on a plate 62 which is hinged at 63. This affords a safety feature protecting against placing an excessive strain on the drive unit 2 or the plunger 59 by some malfunction of the drive mechanism 1 wherein the hook 45 on a coupling member 41 might fail to be disengaged by the plunger 59. In such an event, the engagement of the cam plate 47 on the pusher unit 4 remaining so engaged with the chain 3 is effective to pivot the plate 62 around the hinge 63 against the urging of the tension coil spring 66, to thereby move the plunger 59 into the position shown in broken lines in FIG. 6, and permit the cam plate 47 and the pusher unit 4 to move thereover. In the event of such an occurrence, the drive mechanism 1 may be shut down by the operator and suitable adjustments or repairs made to rectify the condition.

From the foregoing it will be seen that the present invention affords a novel drive mechanism, which is particularly well adapted for use in coin-operated car-washing units, and the like, it merely being necessary for the customer to position his car at station A, start the machine, and pick up his car at station B.

Also, it will be seen that the present invention affords a novel drive mechanism which includes a drive chain constituted and arranged in a novel and expeditious manner, wherein the passes thereof are disposed in substantially uniplanar, horizontally spaced parallel relation to each other.

Also, it will be seen that the present invention affords a novel drive mechanism embodying pusher units constituted and arranged in a novel and expeditious manner.

In addition, it will be seen that the present invention affords a novel pusher unit for use in moving vehicles through car wash units, and the like.

Also, it will be seen that the present invention affords a novel drive mechanism which is practical and efficient in operation and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A drive mechanism for so moving an automobile, and the like, across a floor that during said movement the wheels on one side of said automobile move in one direction along a predetermined path of travel, and wheels on the other side of said vehicle move in said one direction along another predetermined path of travel, said drive mechanism comprising
(a) pusher means for abuttingly engaging one of said wheels one said one side,
(b) means, including a drive chain mounted on said floor between said paths of travel, for driving said pusher means along said path of travel in an automobile moving operation,
(c) said drive chain having two horizontally spaced passes between said paths of travel,
  (1) one pass being adjacent to said one path of travel for moving said pusher means in said one direction, and
  (2) the other pass being on the side of said one pass remote from said one path of travel for moving said pusher means in the direction opposite to said one direction in a return movement to said path of travel for another movement in said one direction, and
(d) means on said floor between said paths of travel and engageable with said pusher means for bracing said pusher means against horizontal swinging movement during said movement of said pusher means in said one direction.

2. A drive mechanism for so moving an automobile across a floor that a wheel on one side of said automobile moves in one direction along a predetermined path of travel across said floor, said drive mechanism comprising
(a) an elongated guide rail mounted on said floor and extending thereacross in horizontally spaced substantially parallel relation to said path of travel,
(b) pusher units for engaging such wheels and pushing said wheels along said path of travel,
(c) means for driving said pusher units along said path of travel,
(d) said means including a drive chain
  (1) mounted on said floor, and
  (2) having one pass movable in said one direction on the other side of said guide rail from said path of travel,
(e) means for operatively connecting said pusher units to said chain for movement therewith,
(f) said pusher units being movable by said chain in said one direction along said path of travel when so operatively connected to said one pass,
(g) means on said pusher units and engageable with said guide rail for holding said pusher units against lateral movement relative to said path of travel during movement therealong, and
(h) means for automatically disconnecting said pusher units from said chain after completion of such movement thereof along said path of travel.

3. In a drive mechanism for moving automobiles, and the like, along a path of travel, and which drive mechanism includes an elongated guide rail including a longitudinally extending side rail having a longitudinally extending slot therein, and a drive chain extending parallel to said rail and movable in one direction along said path of travel,
(a) a pusher unit comprising
  (1) a frame having
    (a') a front portion and
    (b') a rear portion,
  (2) means for movably supporting said frame for movement forwardly along said path of travel in said one direction,
  (3) said means including
    (a') supporting wheels rotatably mounted on said frame, and
    (b') a shaft extending from said frame and projecting into said slot in sliding engagement with said side rail,
  (4) a pusher bar mounted on said front portion for abuttingly engaging such an automobile during such movement of said frame along said path of travel, (5) coupling means mounted on said frame and movable between
    (a') a retracted position ineffective to operably connect said frame to said chain for movement thereby in said one direction along said path of travel, and
    (b') an extended position effective to so connect said frame to said chain, and
  (6) abutment means on said rear portion and projecting rearwardly from said frame for releasably engaging said coupling means on another of said units and thereby releasably holding said last-mentioned coupling means in said retracted position.

4. The combination as defined in claim 3, and in which
(a) said coupling means comprises an elongated arm
  (1) pivotally mounted on said frame, and
  (2) having a hooked front end for operatively engaging said chain.

5. The combination as defined in claim 4, and in which
(a) said abutment means comprises another elongated arm
  (1) projecting rearwardly from said frame, and
  (2) having an offset free end portion for so releasably engaging said front end of said first-mentioned elongated arm of another of said units.

6. A pusher unit for use in a drive mechanism including a drive unit for moving automobiles, and the like, comprising
(a) a supporting frame having a front portion,
(b) means for supporting said frame for movement in a forward direction,
(c) a pusher bar on said front portion for abuttingly engaging such an automobile during such forward movement of said frame,
(d) coupling means mounted on said frame and projecting therefrom laterally to said direction for operatively connecting said frame to such a drive unit for movement thereby in said forward direction, and
(e) abutment means on said frame for operatively engaging said coupling means on another of said units for holding said last-mentioned coupling means out of said connecting relation to such a drive unit.

7. A pusher unit for use in a drive mechanism including a drive unit for moving automobiles, and the like, comprising
(a) a supporting frame having a front portion, and a rear portion,
(b) wheels rotatably mounted on said frame for supporting said frame for forward movement,
(c) a pusher bar for pushingly engaging such an automobile during such forward movement of said frame,
(d) said pusher bar including a roller rotatably mounted on said front portion for engaging said automobile,
(e) an elongated coupling arm
  (1) extending laterally outwardly from one side of said frame, and
  (2) having a front end portion movable between
    (a') an extended position for connecting said frame to such a drive unit and
    (b') a retracted position for disconnecting said frame from such a drive unit, and
(f) an elongated abutment arm
  (1) extending rearwardly from said frame, and
  (2) having a rear end portion projecting laterally outwardly from said one side of said frame to a position operable to engage said coupling arm of another such unit and move said last-mentioned coupling arm from said extended position to said retracted position when said other unit moves forwardly directly up to the rear of said frame.

8. A drive mechanism for moving an automobile, and the like, comprising
  (a) a storage station,
  (b) two pusher units,
  (c) one of said pusher units being disposed at a forwardmost position at said station,
  (d) the other of said units being disposed at a second position at said station rearwardly of said one unit,
  (e) drive means for moving said pusher units forwardly from said storage station, through a path of travel effective to so move such an automobile, and back to said station,
  (f) connecting means on said units for operatively connecting said units to said drive means for such movement thereby,
  (g) control means
     (1) at said forwardmost position, and
     (2) movable between
        (a') one position effective to operatively engage said connecting means on said units and hold said units against said operative connection with said drive means when said units are disposed at said forwardmost position, and
        (b') another position effective to free said connecting means on said units for said operative connection to said drive means for such movement thereby when said units are disposed at said forwardmost position,
  (h) said other unit being movable from said second position to said forwardmost position during said movement of said one unit by said drive means,
  (i) means disposed between said forwardmost and second positions in position to be operatively engaged by said second unit during movement of said second unit from said second position to said forwardmost position, and
  (j) means operable in response to said operative engagement of said last-mentioned means to dispose said control means in said one position.

9. A drive mechanism for moving a wheeled vehicle along a predetermined path of travel comprising
  (a) means for pushingly engaging a wheel of such a vehicle,
  (b) means for moving said first-mentioned means along said path of travel,
  (c) said first mentioned means comprising a pusher unit including
     (1) supporting means movable along said path of travel, and
     (2) a roller mounted on and carried by said supporting means in position to rollingly and abuttingly engage said wheel during such movement of said supporting means along said path of travel,
  (d) said roller sloping rearwardly and outwardly relative to said wheel at an acute angle to the perpendicular to said path of travel during said engagement of said roller with said wheel,
  (e) a guide rail extending along said path of travel, and
  (f) said supporting means including abutment means enageagable with opposite sides of said guide rail during said movement of said supporting means along said path of travel to thereby hold said roller in said engagement with said wheel.

10. A drive mechanism for so moving an automobile, and the like, that during said movement the wheels on one side of said automobile move in one direction along a predetermined path of travel, said drive mechanism comprising
  (a) pusher means for abuttingly engaging one of said wheels on said one side,
  (b) means, including a drive chain, for moving said pusher means along said path of travel,
  (c) said drive chain having
     (1) one pass adjacent to said path of travel for moving said pusher means in said one direction, and
     (2) another pass on the side of said one pass remote from said path of travel for moving said pusher means in the direction opposite to said one direction,
  (d) a storage station,
  (e) said pusher means being movable by said chain away from said station, along said path of travel in said one direction, and in the opposite direction back to said station, and
  (f) means at said station for automatically disconnecting said pusher means from said chain upon said movement of said pusher means in said opposite direction into said station.

11. A drive mechanism as defined in claim 10 and in which
  (a) said pusher means comprise a plurality of pusher units operatively connectable to, and disconnectable from said chain, and
  (b) each of said pusher units includes means for operatively disconnecting an adjacent pusher unit in said station from said chain.

12. A drive mechanism for so moving an automobile across a floor that a wheel on one side of said automobile moves in one direction along a predetermined path of travel across said floor, said drive mechanism comprising
  (a) an elongated guide rail mounted on said floor and extending thereacross in horizontally spaced substantially parallel relation to said path of travel,
  (b) pusher units for engaging such wheels and pushing said wheels along said path of travel,
  (c) means for moving said pusher units along said path of travel,
  (d) said means including a drive chain
     (1) mounted on said floor, and
     (2) having one pass movable in said one direction on the other side of said guide rail from said path of travel,
  (e) means for operatively connecting said pusher units to said chain for movement therewith,
  (f) said pusher units being movable by said chain in said one direction along said path of travel when so operatively connected to said one pass, and
  (g) means on said pusher units and engageable with said guide rail for holding said pusher units against lateral movement relative to said path of travel during movement therealong,
  (h) said means for operatively connecting said pusher units to said chain including
     (1) a pin on said chain and movable therewith, and
     (2) a coupling member on each of said units and movable into and out of connecting engagement with said pin.

13. A drive mechanism as defined in claim 12, and
  (a) which includes
     (1) means for disconnecting said coupling members from said pin, and
  (b) in which said means for disconnecting includes
     (1) cam means on said coupling members,
     (2) abutment means adapted to be mounted in said floor in position to engage said cam means and move said coupling members out of said connecting engagement with said pin, and
     (3) other abutment means on each of said pusher units for operatively engaging said cam means on another of said units and move said coupling members out of said connecting engagement with said pin.

14. A drive mechanism as defined in claim 12, and
  (a) which includes
     (1) means for disconnecting said coupling members from said pin, and (b) in which said means for disconnecting includes
  (1) cam means on said coupling members, and
  (2) abutment means adapted to be mounted in such a floor in position to operatively engage said cam means and move said coupling members out of said connecting engagement with said pin when said pusher units move into one position on said floor.
15. A drive mechanism as defined in claim 14, and
(a) in which
  (1) said abutment means includes
    (a') an elongated pin, and
    (b') means for moving said pin between an upwardly extending position relative to said floor and a lower portion, and
  (2) said elongated pin is pivotably mounted in said floor for movement from said upwardly extending position to a lower position when more than a predetermined force is exerted in one direction on said pin.

References Cited by the Examiner

UNITED STATES PATENTS

| | | | |
|---|---|---|---|
| 512,066 | 1/94 | Spitzer | 104—172 |
| 1,170,332 | 2/16 | Reno | 104—171 |
| 1,864,711 | 6/32 | Buetell. | |
| 2,016,662 | 10/35 | Aitken | 105—27 |
| 2,619,370 | 11/52 | Leger | 104—172 X |
| 2,863,399 | 12/58 | Howard | 104—176 |
| 2,994,283 | 8/61 | Merritt | 104—162 |
| 3,058,433 | 10/62 | Hurst | 104—172 |
| 3,120,196 | 2/64 | Peter | 104—172 |

FOREIGN PATENTS

| | | |
|---|---|---|
| 214,076 | 3/58 | Australia. |

EUGENE G. BOTZ, *Primary Examiner.*

LEO QUACKENBUSH, *Examiner.*